Feb. 11, 1930. J. J. BARRY 1,746,813
FISH SCALER
Filed June 11, 1925
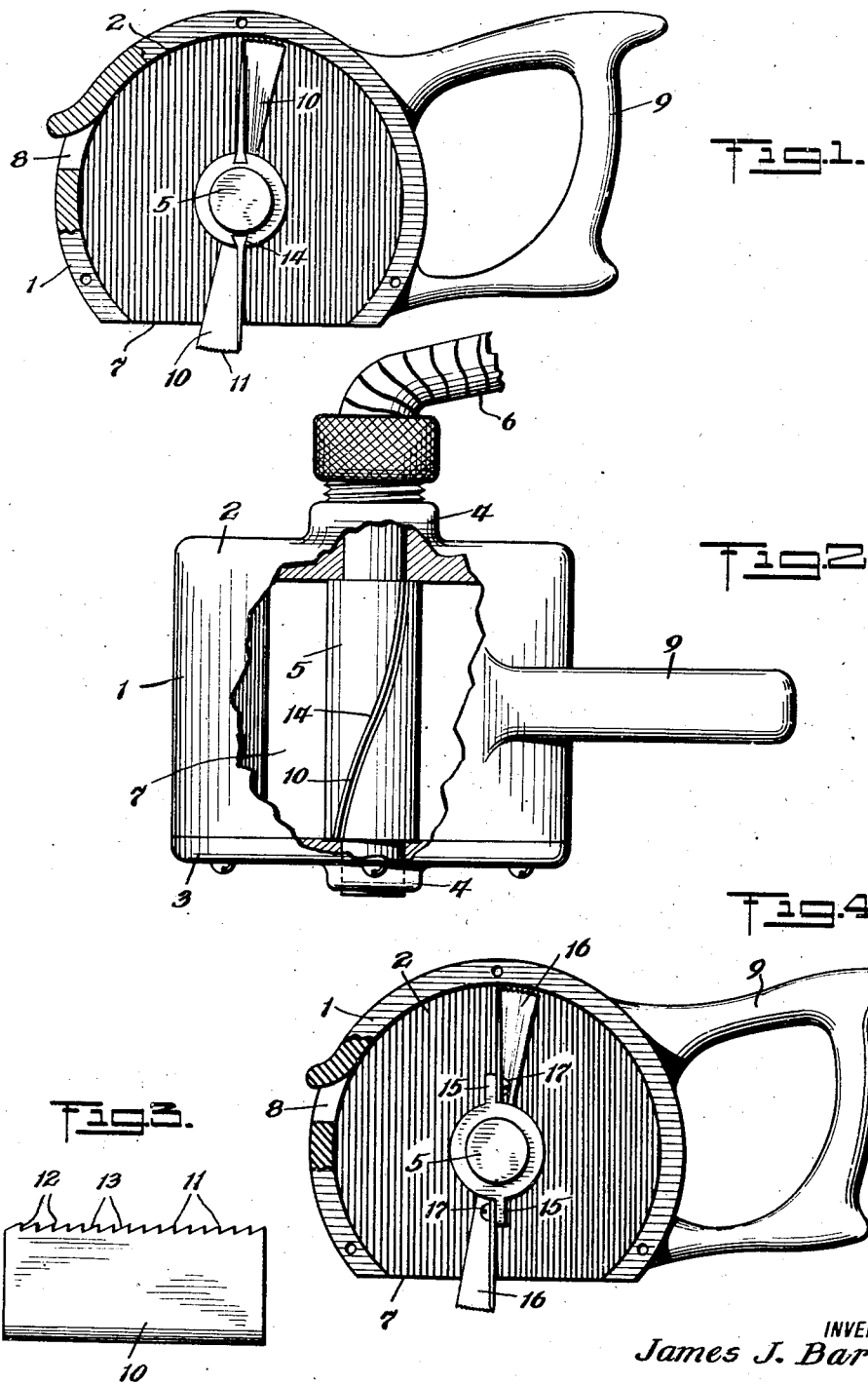
INVENTOR
James J. Barry
BY
King + Schlatt
ATTORNEYS Patented Feb. 11, 1930

1,746,813

UNITED STATES PATENT OFFICE

JAMES J. BARRY, OF GLOUCESTER, MASSACHUSETTS, ASSIGNOR TO GENERAL SEAFOODS CORPORATION, OF GLOUCESTER, MASSACHUSETTS, A CORPORATION OF MASSACHUSETTS

FISH SCALER

Application filed June 11, 1925. Serial No. 36,352.

This invention relates to fish scalers, and the disclosure herein has reference more particularly to application of the said invention to hand controlled power driven fish scalers.

The objects of the invention are to provide a fish scaler having a rotating flexible blade; to cause said blade to intermittently engage and disengage the fish; to provide a blade which will not bind when engaging an obstruction, such as a fin; to provide teeth on said blade which are abrupt on the forward edge so as to lift the scales; to prevent the housing from becoming clogged with scales; to provide simple and efficient means for mounting the blade at an angle with respect to the axis of rotation; to provide improved means for gripping or holding the scaler in operation; to secure simplicity of construction and operation, and to obtain other advantages and results as may be brought out in the following description.

Referring to the accompanying drawing in which like numerals of reference indicate similar parts throughout the several views;

Figure 1 is a side elevation of a scaler with the end plate removed and a part broken away;

Figure 2 is a plan thereof with a part of the housing broken away to disclose the blade;

Figure 3 is a front elevation of the blade, and

Figure 4 is an end view corresponding to Fig. 1, showing a modified means of mounting the blade.

In the specific embodiment of the invention illustrated in said drawing, the reference numeral 1 indicates a substantially cylindrical housing shown with one fixed end 2 and a removable end 3. The opposite ends 2, 3 provide central bearings 4 for rotatably mounting a shaft 5 which extends axially through said cylindrical housing, and is driven by any suitable connection at one end thereof by a suitable flexible shaft 6 in turn driven by an appropriate source of power such as an electric motor (not shown).

One longitudinal side portion of the cylindrical housing 1 is cut away, preferably on a chordal plane parallel with the axis, thereby providing an opening 7 through which the blade (hereinafter described) may operate. At a distance above the said opening 7, preferably at the forward side of the housing is provided a slot 8 longitudinally of said housing for ejectment of the scales. Projecting rearwardly from said housing is a "sawhandle" grip 9 by means of which the scaler may be held and manipulated by the operator naturally and with greatest ease and efficiency.

Carried by the shaft are preferably a pair of oppositely projecting blades 10 which extend substantially the length of the inside of the housing and to the inside peripheral wall thereof. Furthermore, said blades are arranged spirally so as to be at an angle with respect to the axis of rotation, and so as to engage the fish with an advancing stroke. It is also an important feature of the present invention to employ a flexible blade. I find this flexibility advantageous in operation, it enabling the blade to respond to the resistance of the scales and get under and lift the scales more positively. The flexibility of the blade also enables the blade to flex and pass on when it comes in engagement with an obstruction such as a fin. It may here be noted that in operation the fin of the fish is frequently drawn into the scaler, and with a device not employing a flexible blade, the rotating member is stopped by the fin which often delays the operator for a considerable time. I avoid this jamming effect and consequent delay by use of the flexible blade described.

Furthermore, it is to be noted, that I employ blades so few in number and of such depth, as to provide space between the housing wall and the shaft for a quantity of scales which will therefore not be pressed and caked together and accordingly will be more freely ejected from the interior of the housing and less likely to lodge between the edge of the blade and the interior wall of said housing. Also, the blades are so few in number as to necessarily result in positive disengagement of one blade from the fish before another comes into engagement therewith.

Preferably the blades are each angularly disposed with respect to the axis of the shaft so the edge will engage the fish with an advancing or swiping motion. Furthermore, the outer edges of the blades are provided with teeth 11 and the advancing edges 12 of the teeth preferably are more perpendicular with respect to the axis of the shaft than the other or following edges 13 of said teeth. Without attempting to confine myself to any theory of operation, it appears that the provision of abrupt or more perpendicular edges of the teeth at the advancing side enables the teeth to more positively get under and raise the scales, thereby removing the scales more perfectly and quickly.

The means for mounting the blades may be varied, and for illustrative purposes I have shown in the preferred embodiment helical slots 14 cut in the shaft, said slots being undercut or dovetailed, the longitudinal edge of the blade being correspondingly flared and slid in from one end of the slot. In Figure 4, I have shown flanges 15 cast or otherwise formed on or carried by the shaft, and blades 16 secured flatwise against the flanges by suitable means such as screws 17. These blades 16 are likewise flexible and accomplish the purposes and results of the blades of the heretofore described embodiment. Obviously other detail changes and modifications may be made in the manufacture and use of my improved scaler, and I do not wish to be understood as limiting myself to the exact structure shown except as set forth in the following claim when construed in the light of the prior art.

Having thus described my invention, I claim:—

A fish scaler having a housing, blades rotatable in said housing, said housing having an opening substantially the length of said blades through which said blades intermittently project as they rotate, the outer edges of said blades being separated further than the distance across said opening so as to positively disengage one blade from a fish before the next blade can engage the fish.

JAMES J. BARRY.